United States Patent
Park et al.

(10) Patent No.: US 8,947,425 B2
(45) Date of Patent: Feb. 3, 2015

(54) METHOD AND APPARATUS FOR PROCESSING AND DISPLAYING A THREE-DIMENSIONAL IMAGE WITH VARIABLE DEPTH EFFECT

(75) Inventors: Mun-San Park, Hwaseong-si (KR); Joo-Young Kim, Suwon-si (KR); Cheol-Woo Park, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 307 days.

(21) Appl. No.: 13/364,035

(22) Filed: Feb. 1, 2012

(65) Prior Publication Data

US 2012/0249526 A1    Oct. 4, 2012

(30) Foreign Application Priority Data

Apr. 4, 2011    (KR) .......................... 10-2011-0030460

(51) Int. Cl.
*G06T 15/00* (2011.01)
*H04N 13/00* (2006.01)

(52) U.S. Cl.
CPC ....... *H04N 13/0007* (2013.01); *H04N 13/0011* (2013.01); *H04N 13/0022* (2013.01)
USPC ........................................................ 345/419

(58) Field of Classification Search
USPC ........................................................ 345/419
See application file for complete search history.

(56) References Cited

U.S. PATENT DOCUMENTS

| | | | | |
|---|---|---|---|---|
| 2010/0007661 A1* | 1/2010 | Kim et al. | ...................... | 345/419 |
| 2010/0027115 A1* | 2/2010 | De Boer et al. | ............... | 359/463 |
| 2010/0103249 A1* | 4/2010 | Lipton et al. | ..................... | 348/51 |
| 2012/0288184 A1* | 11/2012 | Zomet | .......................... | 382/154 |

FOREIGN PATENT DOCUMENTS

| | | |
|---|---|---|
| JP | 10-327432 | 12/1998 |
| JP | 2003-284095 | 10/2003 |
| KR | 10-0868244 | 11/2008 |
| KR | 10-2010-0007079 | 1/2010 |

OTHER PUBLICATIONS

English Abstract for Publication No. 10-327432.
English Abstract for Publication No. 10-0868244.
English Abstract for Publication No. 10-2010-0007079.
English Abstract for Publication No. 2003-284095.

* cited by examiner

*Primary Examiner* — David Zarka
*Assistant Examiner* — Vu Nguyen
(74) *Attorney, Agent, or Firm* — F. Chau & Associates, LLC (57) ABSTRACT

A method of processing a 3D image data includes calculating shift values of gray-scales for a reference view using a 3D effect selection signal having a selection depth value of the 3D image inputted by a user. Shift values of the gray-scales respectively corresponding to a plurality of views are calculated using the shift values of the gray-scales for the reference view. The shift values of the gray-scales respectively corresponding to the plurality of views are applied to a source image signal to generate a plurality of image frames.

18 Claims, 10 Drawing Sheets

| VIEW | SHIFT VALUES OF GRAY-SCALES | | | | | | | | |
|---|---|---|---|---|---|---|---|---|---|
| | 0 | 1 | 2 | ... | 128 | ... | 253 | 254 | 255 |
| VIEW 1 | Smin_R | | | ... | 0 | ... | | | Smax_R |
| VIEW 2 | Smin_2 | | | ... | 0 | ... | | | Smax_2 |
| ⋮ | ⋮ | ⋮ | | ⋮ | ⋮ | ⋮ | | | ⋮ |
| VIEW 5 | Smin_5 | | | ... | 0 | ... | | | Smax_5 |
| ⋮ | ⋮ | | | ⋮ | ⋮ | ⋮ | | | ⋮ |
| VIEW 8 | Smin_8 | | | ... | 0 | ... | | | Smax_8 |
| VIEW 9 | Smin_9 | | | ... | 0 | ... | | | Smax_9 |

METHOD AND APPARATUS FOR PROCESSING AND DISPLAYING A THREE-DIMENSIONAL IMAGE WITH VARIABLE DEPTH EFFECT

CROSS-REFERENCE TO RELATED APPLICATIONS

This application claims priority under 35 U.S.C. §119 to Korean Patent Application No. 10-2011-0030460, filed on Apr. 4, 2011 in the Korean Intellectual Property Office (KIPO), the contents of which are herein incorporated by reference in their entireties.

BACKGROUND

1. Technical Field

Example embodiments of the present invention relate to three-dimensional (3D) images, and more particularly, to a method and apparatus for processing and displaying a 3D image.

2. Discussion of the Related Art

Stereoscopic image display relates to the display of different images to a left and right eye of the observer. By presenting slightly different images to each eye, an observer is able to combine the two images in his or her brain and accordingly perceive a single combined image that instills a perception of depth. There are two distinct forms of stereoscopic image display devices; a first form of stereoscopic image display, generally referred to simply as "stereoscopic type," involves the use of special glasses to assist in preventing each eye from seeing the wrong image. The second form of stereoscopic image display is generally referred to as "auto-stereoscopic type" in which special glasses are not used.

There are multiple forms of stereoscopic type image display. In a passive polarized glasses method, the special 3D glasses utilize a first a polarized filter on a first eye piece and a second polarized filter on a second eye piece. The two polarized filters each have a different polarized axis according. In an active shutter glasses method, the special 3D glasses utilize active shutters over the left eye piece and the right eye piece. The shutters are considered to be "active" because they can be altered to permit or block light, as desired. A left-eye image and a right-eye image are time-divided to be periodically displayed. For example, the display device may alternate between showing the left-eye image and the right-eye image. The shutters of the 3D glasses may be synchronized with the display device so that the left-eye shutter is closed when the display device displays the right-eye image and the right-eye shutter is closed when the display device displays the left-eye image.

There are also different types of auto-stereoscopic type 3D displays. The first type is a parallax barrier method and the second type is a lenticular method. The lenticular method uses lenticular lens that permit different images to be displayed from different directions. The lenticular lens refracts an incident light into distinct views. The parallax barrier method uses an array of barriers positioned a small distance away from the display panel of the display device so that an observer positioned at a proper distance from the display device may find that image sections forming the left-eye image are blocked from the right eye by the barrier while image sections forming the right-eye image are blocked from the left eye by the barrier. However, as every other image section is blocked from the view of one eye by the barrier, the effective resolution and the perceived brightness of the parallax barrier display are each reduced by approximately half.

However, different users may perceive 3D effects differently and accordingly it is difficult to provide a 3D image display that is satisfactory to all users.

SUMMARY

Exemplary embodiments of the present invention provide a method of processing a three-dimensional (3D) image capable of adjusting a 3D effect so that different users may be able to adjust the 3D image display to suit their individual demands.

Exemplary embodiments of the present invention also provide a display apparatus performing the method of displaying the 3D image.

According to an exemplary embodiment of the present invention, a method of processing a 3D image includes receiving a source image. A 3D image depth selection value is received from a user. Shift values for shifting the received source image are calculated based on the received 3D image depth selection value. The calculated shift values are applied to the source image signal to generate a 3D image depth-adjusted image.

According to an exemplary embodiment of the present invention, a method of processing 3D image data is provided. In the method, shift values are calculated to shift pixel intensity values (gray-scale values) of a reference view by a desired amount. These shift values are calculated using a 3D effect selection signal having a selection depth value of the 3D image. A user may provide the 3D effect selection signal according to the user's individual demands. Shift values of the gray-scales are calculated respectively for a plurality of views using the shift values of the gray-scales for the reference view. The shift values of the gray-scales respectively corresponding to the plurality of views are applied to a source image signal to generate a plurality of image frames to be displayed.

In an exemplary embodiment, calculating the shift values of the gray-scales for the reference view may include calculating a maximum shift value to a maximum gray-scale for the reference view based on the selection depth value, calculating a minimum shift value to a minimum gray-scale for the reference view using the maximum shift value, and calculating middle shift values to middle gray-scales for the reference view using the maximum and minimum shift values, and the middle gray-scales between the maximum gray-scale and the minimum gray-scale for the reference view.

In an exemplary embodiment, calculating the middle shift values of the middle gray-scales may include calculating a first middle shift value linearly increasing from a preset shift value to the maximum shift value and calculating a second middle shift value linearly decreasing from the preset shift value to the minimum shift value.

In an exemplary embodiment, calculating the middle shift values of the middle gray-scales may include calculating a first middle shift value non-linearly increasing from a preset shift value to the maximum shift value and calculating a second middle shift value non-linearly decreasing from the preset shift value to the minimum shift value.

In an exemplary embodiment, the method may further include generating a composite image using the plurality of image frames.

In an exemplary embodiment, the method may further include generating the source image signal using a difference of view between a left-eye image signal and a right-eye image signal.

In an exemplary embodiment, applying the shift values of the gray-scales may include selecting two views based on the 3D effect selection signal and applying the shift values of the gray-scales for the selected two views to the source image signal to generate a left-eye image frame and a right-eye image frame.

In an exemplary embodiment, the method may further include generating a black image frame between the left-eye image frame and the right-eye image frame.

According to an exemplary embodiment of the present invention, a display apparatus includes a display panel, a 3D effect adjusting part, a multi-view image generating part, and a panel driving part. The display panel displays a 3D image. The 3D effect adjusting part calculates shift values of gray-scales for a reference view using a 3D effect selection signal having a selection depth value of the 3D image inputted by a user and calculates shift values of the gray-scales respectively corresponding to a plurality of views using the shift values of the gray-scales for the reference view. The multi-view image generating part applies the shift values of the gray-scales respectively corresponding to the plurality of views to a source image signal to generate a plurality of image frames. The panel driving part converts an image signal of the image frames into an analogue type data signal and provides the data signal to the display panel.

In an exemplary embodiment, the 3D effect adjusting part may include a max/min calculating part calculating a maximum shift value of a maximum gray-scale for the reference view based on the selection depth value and calculating a minimum shift value of a minimum gray-scale for the reference view using the maximum shift value, a middle calculating part calculating middle shift values of middle gray-scales for the reference view using the maximum and minimum shift values, and the middle gray-scales between the maximum gray-scale and the minimum gray-scale for the reference view, and a multi-view image calculating part calculating shift values of the gray-scales respectively corresponding to a plurality of views using the shift values of the gray-scales for the reference view.

In an exemplary embodiment, the middle calculating part may calculate a first middle shift value linearly increasing from a preset shift value to the maximum shift value and may calculate a second middle shift value linearly decreasing from the preset shift value to the minimum shift value.

In an exemplary embodiment, the middle calculating part may calculate a first middle shift value nonlinearly increasing from a preset shift value to the maximum shift value and may calculate a second middle shift value nonlinearly decreasing from the preset shift value to the minimum shift value.

In an exemplary embodiment, the display apparatus may further include a composite image generating part generating a composite image using the plurality of image frames.

In an exemplary embodiment, the display panel includes a panel part including a plurality of pixels and a lens part disposed on the panel part and including a lens refracting an image displayed on the panel part into a plurality of views.

In an exemplary embodiment, the display apparatus may further include a source image generating part generating the source image signal using a view difference between a left-eye image signal and a right-eye image signal.

In an exemplary embodiment, the multi-view image calculating part may select two views among the plurality of views based on the 3D effect selection signal of the user.

In an exemplary embodiment, the multi-view image calculating part may apply the shift values of the gray-scales for the selected two views to the source image signal to generate a left-eye image frame and a right-eye image frame.

In an exemplary embodiment, the display apparatus may further include a left/right image processing part generating at least one of the left-eye image frame and at least one of the right-eye image frame using the left-eye image frame and the right-eye image frame.

In an exemplary embodiment, the display apparatus may further include a timing control part generating a black image frame inserted between the left-eye image frame and the right-eye image frame.

According to exemplary embodiments of the present invention, a 3D effect of the 3D stereoscopic image may be adjusted by the user so that a 3D effect may be tailored to the satisfaction of the user.

In an exemplary embodiment, a method of displaying a 3D image includes receiving a source image. A default depth value is received. A 3D image depth selection signal is received. The received source image is modified using the received 3D image depth selection signal to produce a modified 3D image when the 3D image depth selection signal includes a 3D depth selection value provided by a user. The received source image is modified using the received default depth value to produce the modified 3D image when the 3D image depth selection signal does not include a 3D depth selection value provided by the user. The modified 3D image is displayed using an autostereoscopic display device.

BRIEF DESCRIPTION OF THE DRAWINGS

The above and other features and aspects of the present invention will become more apparent by describing in detailed example embodiments thereof with reference to the accompanying drawings, in which.

DETAILED DESCRIPTION OF EXEMPLARY EMBODIMENTS

Hereinafter, exemplary embodiments of the present invention will be explained in detail with reference to the accompanying drawings.

Figure 1:
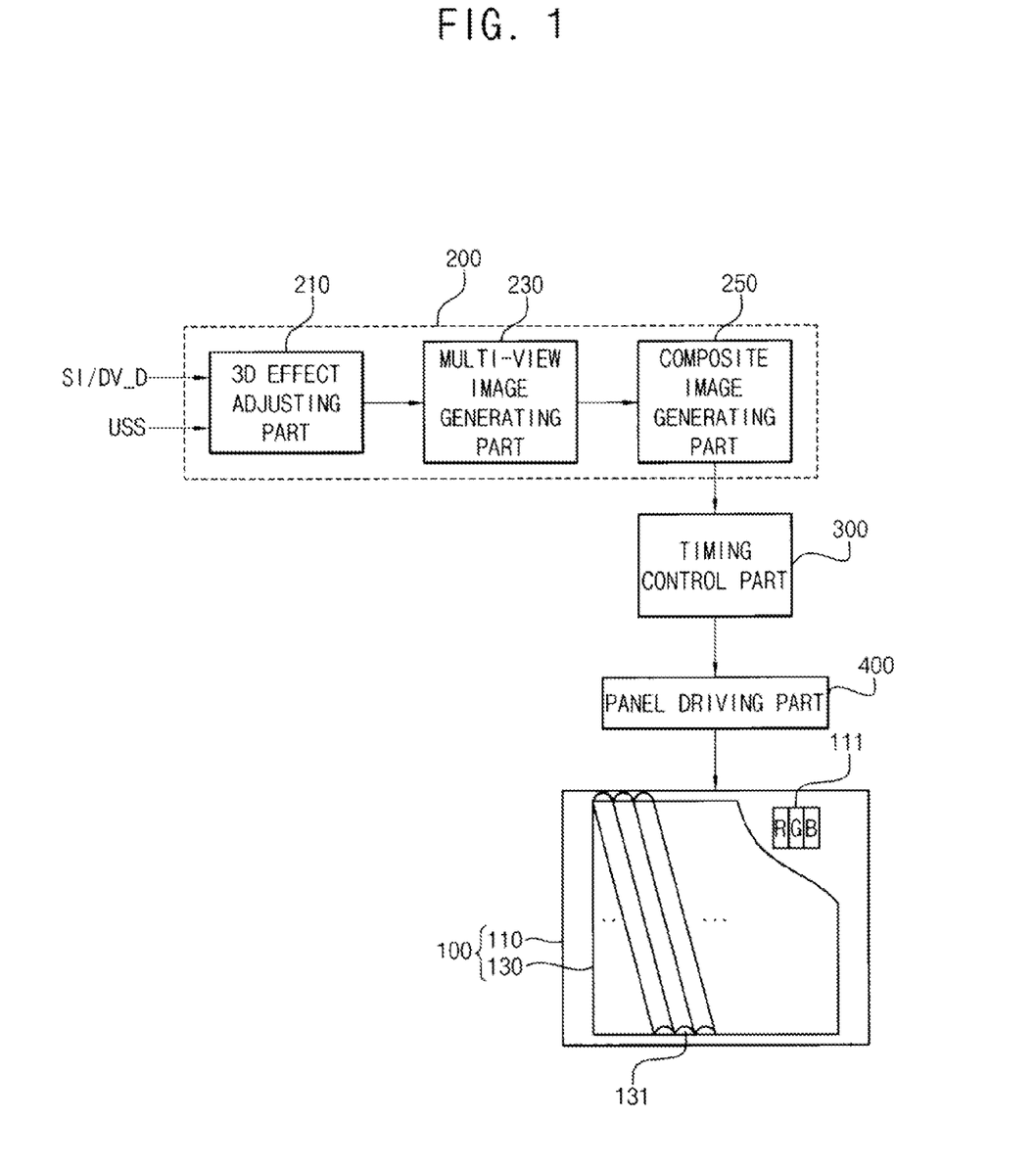
FIG. 1 is a block diagram illustrating a display apparatus according to an exemplary embodiment of the present invention.

FIG. 1 is a block diagram illustrating a display apparatus according to an exemplary embodiment of the present invention.

Referring to FIG. 1, the display apparatus includes a display panel 100, an image processing part 200, a timing control part 300 and a panel driving part 400.

The display panel 100 includes a panel part 110 and a lens part 130. The panel part 110 includes a plurality of pixels 111. The panel part 110 displays an image thereon. The lens part 130 includes a plurality of lenses 131 disposed on the panel part 110. The plurality of lenses may be lenticular lenses and may refract the image displayed on the panel part 110 into multi-view image. Exemplary embodiments of the present invention are not limited to the use of a lenticular lens, for example, a parallax barrier may be used in place of the lenticular lens.

The image processing part 200 includes a 3D effect adjusting part 210, a multi-view image generating part 230 and a composite image generating part 250.

The 3D effect adjusting part 210 receives a source image signal SI and a default depth value DV_D corresponding to a 3D depth information of the source image signal SI from an external device. The 3D effect adjusting part 210 receives a 3D effect selection signal USS for the 3D image. The 3D effect selection signal USS may be inputted by a user. The 3D effect adjusting part 210 generates shift values of gray-scales respectively corresponding to the multi-view image based on the 3D effect selection signal USS.

The multi-view image generating part 230 generates a plurality of image frames corresponding to the multi-view image using the shift values of the gray-scales respectively corresponding to the multi-view image. For example, when the display apparatus displays the 3D image of a 9-view image (a multi-view image including 9 distinct views), the 3D effect adjusting part 210 generates the shift values of the gray-scales respectively corresponding to first to ninth views, and provides the shift values of the gray-scales to the multi-view image generating part 230. The multi-view image generating part 230 generates first to ninth image frames using the shift values of the gray-scales respectively corresponding to first to ninth views of the 9-view image.

The composite image generating part 250 combines the image frames of the multi-view image generated from the multi-view image generating part 230 to generate a composite image frame. The composite image frame is a single image frame that intermixes all of the multiple views of the multi-view image in a precise manner of spatial division so that when aligned with the plurality of lenses 131, each of the multiple views may be observed by an observer depending on the observer's angle of observation.

The timing control part 300 processes an image signal of the composite image frame provided from the composite image generating part 250 and provides the image signal to the panel driving part 400.

The panel driving part 400 converts the image signal of the composite image frame into an analogue type data signal and provides the data signal to the panel part 110 of the display panel 100. The panel part 110 displays the composite image which is spatially divided into the multi-view image by the plurality of lenses 131. Accordingly, the lens part 130 of the display panel 100 refracts the composite image displayed on the panel part 110 into the multiple image views of the multi-view image.

Accordingly, by providing a desired level of 3D effect, the user may view the 3D image in a way that is most desirable to the user.

Figure 2:
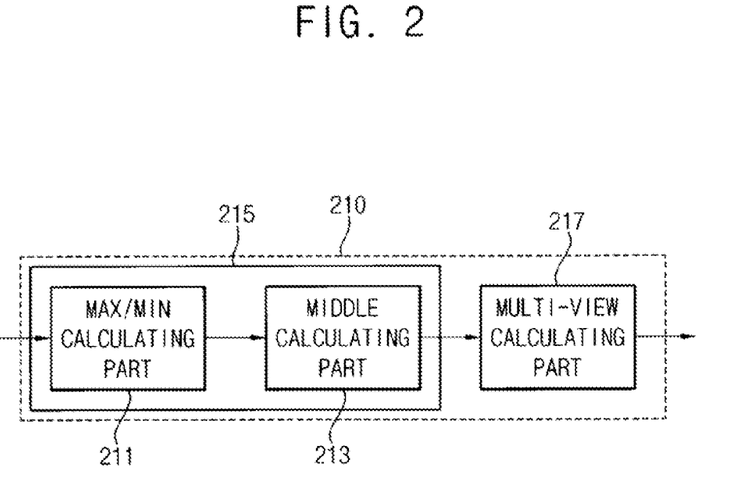
FIG. 2 is a block diagram illustrating a 3D effect adjusting part of FIG. 1.

FIG. 2 is a block diagram illustrating a 3D effect adjusting part of FIG. 1.

Referring to FIGS. 1 and 2, the 3D effect adjusting part 210 includes a reference shift value calculating part 215 and a multi-view image calculating part 217.

The reference shift value calculating part 215 calculates the shift values of the gray-scales for a reference view preset among the multi-view image of the 3D image based on the 3D effect selection signal USS. The reference shift value calculating part 215 includes a max/min calculating part 211 and a middle calculating part 213.

The max/min calculating part 211 calculates a maximum shift value Smax_R of a maximum gray-scale for the reference view. The 3D effect selection signal USS and an initial 3D information signal are used to calculate the maximum shift value. The max/min calculating part 211 also calculates the minimum shift value Smin_R of a minimum gray-scale for the reference view. The minimum shift value is based on the maximum shift value Smax_R of the maximum gray-scale.

The middle calculating part 213 calculates middle shift values of middle gray-scales between the maximum and minimum gray-scales for the reference view using the maximum and minimum shift values Smax_R and Smin_R calculated from the max/min calculating part 211.

The multi-view image calculating part 217 calculates shift values of the gray-scales respectively corresponding to the multi-view image using the shift values of the gray-scales corresponding to the reference view calculated from the reference shift value calculating part 215.

However, when the 3D effect selection signal USS is not received, the 3D effect adjusting part 210 calculates the shift values of the gray-scale respectively corresponding to the multi-view image using the default depth value DV_D received, as described above.

Figure 3:
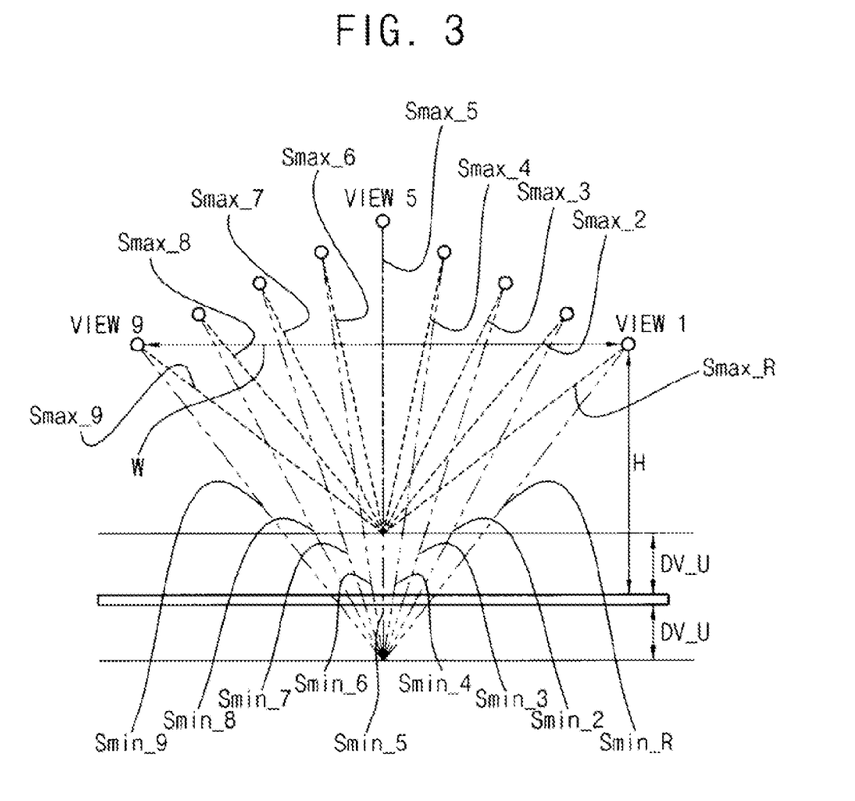
FIG. 3 is a schematic diagram illustrating an algorithm applied to the 3D effect adjusting part of FIG. 2.
Figure 4:
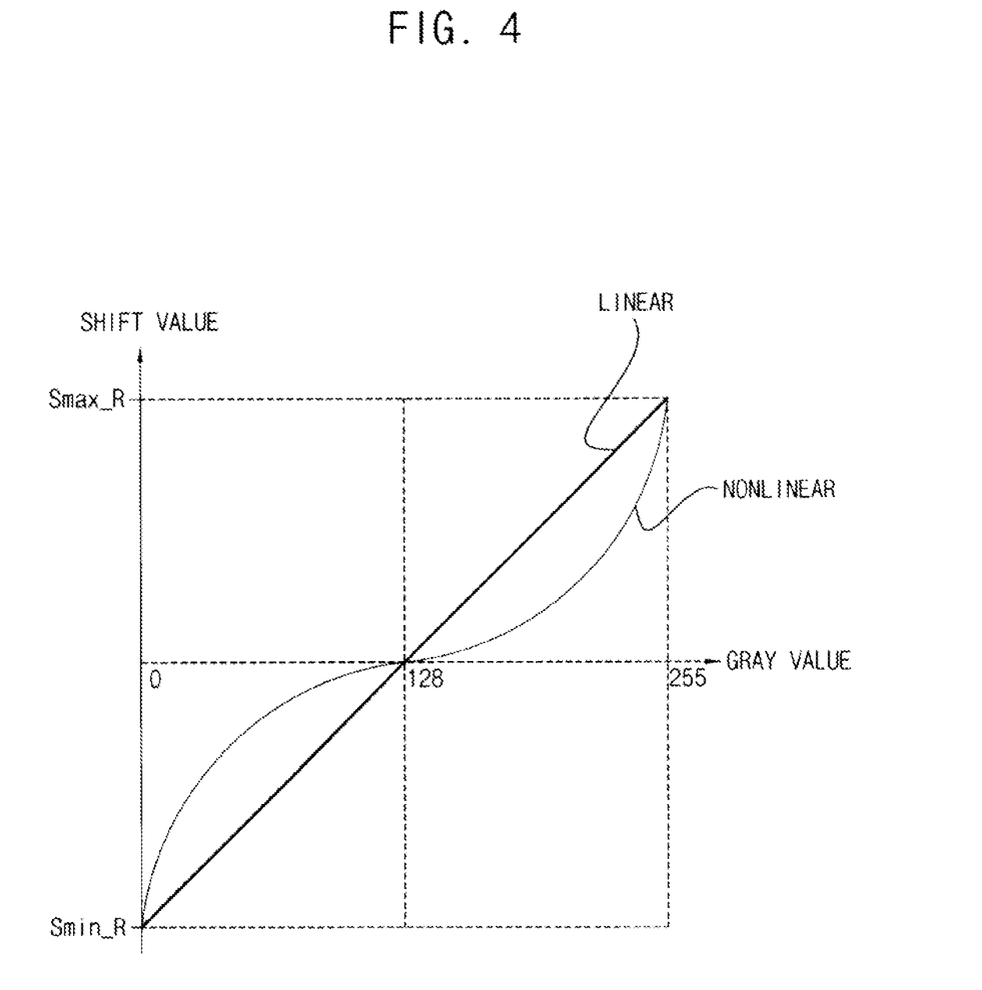
FIG. 4 is a graph diagram illustrating a shift value of a gray-scale showing the function of a reference shift calculating part of FIG. 2.

FIG. 3 is a schematic diagram illustrating an algorithm applied to the 3D effect adjusting part of FIG. 2. FIG. 4 is a graph diagram illustrating a shift value of a gray-scale showing the function of a reference shift calculating part of FIG. 2.

Referring to FIGS. 1, 2 and 3, an initial 3D information signal includes a visibility width W, a visibility distance H determined in accordance with a physical structure of the lens part 130, and a pixel pitch P_pitch determined in accordance with characteristics of the panel part 110, etc. The visibility width W is a maximum sight width within which the viewer may clearly view the 3D image displayed on the display panel 100. The visibility distance H is a maximum distance between the display panel 100 and the viewer within which the 3D image displayed on the display panel 100 may be clearly viewed. For example, when the 3D image includes images of first view VIEW1 to ninth view VIEW9, the visibility width W may be a linear distance between the first view VIEW1 and the ninth view VIEW9 and the visibility distance H may be a linear distance between the display panel 100 and the first view VIEW1 or the ninth view VIEW9. The pixel pitch P_pitch may be a distance between centers of pixels adjacent to each other in the display panel 100.

The max/min calculating part 211 calculates the maximum shift value Smax_R for the reference view using the following Equation 1.

$$Smax\_R = \{(DI\_U \times W)/(H - Smax\_U)\}/P\_pitch \qquad \text{Equation 1}$$

Herein, the DI_U is a selection depth value corresponding to the 3D effect selection signal USS.

The max/min calculating part 211 calculates the maximum shift value Smax_R for the reference view based on the selection depth value DV_U using Equation 1. The max/min calculating part 211 calculates the minimum shift value Smin_R using the maximum shift value Smax_R. The maximum and minimum shift value Smax_R and Smin_R corresponding to the reference view may be different according to the selection depth value DV_U inputted by the user.

For example, referring to FIGS. 3 and 4, the maximum shift value Smax_R is a shift value of the maximum gray-scale which advances the image by the selection depth value DV_U in the first view VIEW1. The minimum shift value Smin_R is a shift value of the minimum gray-scale which recedes the image by the selection depth value DV_U in the first view VIEW1. When the gray-scales of the 3D image ranges from a gray-scale value of "0" to a gray-scale value of "255", the maximum shift value Smax_R is a value that is added to the maximum gray-scale value of "255" and the minimum shift value Smin_R is a value that is subtracted from the minimum gray-scale value of "0".

The max/min calculating part 211 calculates the maximum and minimum shift values Smax_R and Smin_R for the reference view based on the selection shift value Smax_U corresponding to the 3D effect selection signal USS. Thus, the maximum and minimum shift values Smax_R and Smin_R corresponding to the user's desired level of 3D depth effect may be obtained.

The middle calculating part 213 calculates the middle shift values of the middle gray-scales between the maximum and minimum gray-scales using the maximum and minimum shift values Smax_R and Smin_R corresponding to the reference view calculated from the max/min calculating part 211.

Referring to FIG. 4, the middle calculating part 213 calculates a first middle shift value linearly increasing from the preset gray-scale (for example, 128) to the maximum gray-scale (for example, 255) with reference to a gray-scale range of 0 to 255. The middle calculating part 213 calculates a second middle shift value linearly decreasing from the preset gray-scale (for example, 128) to the minimum gray-scale (for example, 0).

Alternatively, the middle calculating part 213 may calculate middle shift values nonlinearly increasing and decreasing from the present gray-scale. The nonlinear path of the calculated middle shift values may follow, for example, the path of an exponential function.

For example, according to the linear approach, when the maximum shift value Smax_R corresponding to the reference view is calculated as "+30", the max/min calculating part 211 calculates the minimum shift value Smin_R for the reference view as "−30". The middle calculating part 213 calculates the first middle shift value linearly increasing by 30/128 from the preset gray-scale (for example, 128) to the maximum gray-scale (for example, 255) and calculates the second middle shift value linearly decreasing by 30/128 from the preset gray-scale (for example, 128) to the minimum gray-scale (for example, 0).

Alternatively, according to the non-linear approach, the middle calculating part 213 calculates the first middle shift value nonlinearly increasing by $30/(128^2)$ from the preset gray-scale (for example, 128) to the maximum gray-scale (for example, 255) and calculates the second middle shift value nonlinearly decreasing by $30/(128^2)$ from the preset gray-scale (for example, 128) to the minimum gray-scale (for example, 0).

In this way, the reference shift value calculating part 215 may calculates the shift values of the gray-scale in relation to the reference view using the selection depth value DV_U corresponding to the 3D depth effect desired by the user.

Figure 5:
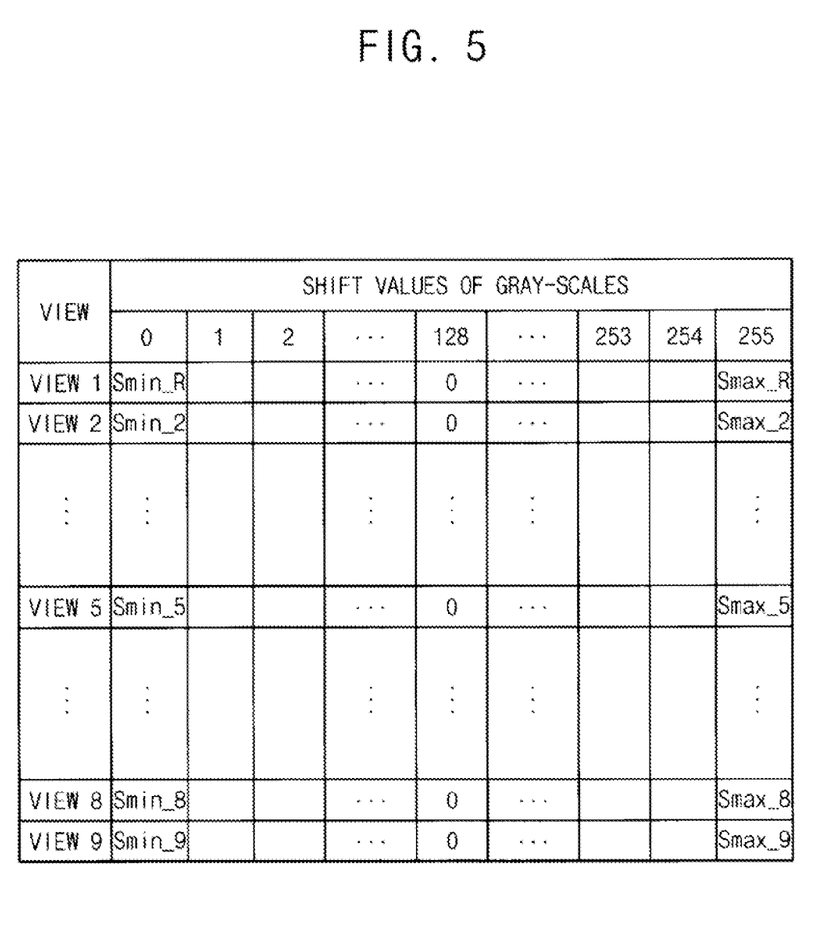
FIG. 5 is a table illustrating shift values for a multi-view image calculating part of FIG. 2.

FIG. 5 is a table illustrating shift values for a multi-view image calculating part of FIG. 2.

Referring to FIGS. 3 and 5, the 3D image may be referred to as the multi-view image. The multi-view image may be a 9-view image and may include first to ninth views. The first view may be referred to as the reference view.

Using the shift values Smin_R, . . . , 0, . . . , Smax_R of the gray-scales for the first view VIEW1 provided from the reference shift value calculating part 215, the multi-view image calculating part 217 calculates shift values Smin__2, . . . , 0, . . . , Smax__2 of the gray-scales for a second view VIEW2, shift values Smin__3, . . . , 0, . . . , Smax__3 of the gray-scales for a third view VIEW3, shift values Smin__4, . . . , 0, . . . , Smax__4 of the gray-scales for a fourth view VIEW4, shift values Smin__5, . . . , 0, . . . , Smax__5 of the gray-scales for a fifth view VIEW5, shift values Smin__6, . . . , 0, . . . , Smax__6 of the gray-scales for a sixth view VIEW6, shift values Smin__7, . . . , 0, . . . , Smax__7 of the gray-scales for a seventh view VIEW7, shift values Smin__8, . . . , 0, . . . , Smax__8 of the gray-scales for an eighth view VIEW8, and shift values Smin__9, . . . , 0, . . . , Smax__9 of the gray-scales for a ninth view VIEW9.

Figure 6:
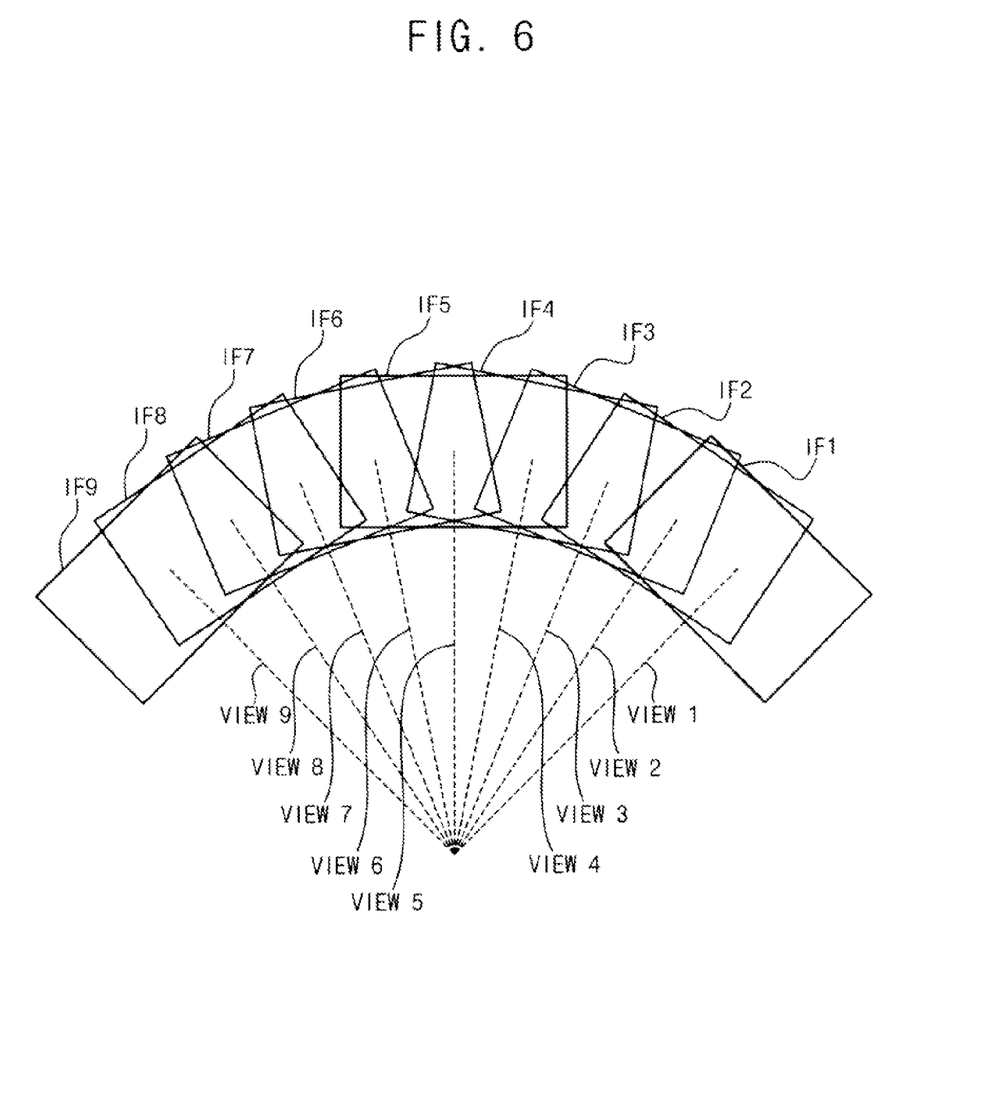
FIG. 6 is a schematic diagram illustrating a multi-view image generating part of FIG. 1.

FIG. 6 is a schematic diagram illustrating a multi-view image generating part of FIG. 1.

Referring to FIGS. 1, 5 and 6, the multi-view image generating part 230 applies the shift values of the gray-scales for the first to ninth views provided from the 3D effect adjusting part 210 to the received source image signal SI and generates the image frames corresponding to the multi-view image. Each of the image frames may include image data corresponding to a resolution of the display panel 100.

For example, the multi-view image generating part 230 generates an image frame IF1 for the first view VIEW1 using the shift values Smin_R, . . . , 0, . . . , Smax_R of the gray-scales. An image frame IF2 is generated for the second view VIEW2 using the shift values Smin__2, . . . , 0, . . . , Smax__2 of the gray-scales. An image frame IF3 is generated for the third view VIEW3 using the shift values Smin__3, . . . , 0, . . . , Smax__3. An image frame IF4 is generated for the fourth view VIEW4 using the shift values Smin__4, . . . , 0, . . . , Smax__4 of the gray-scales. An image frame IF5 is generated for the fifth view VIEW5 using the shift values Smin__5, . . . , 0, . . . , Smax__5 of the gray-scales. An image frame IF6 is generated for the sixth view VIEW6 using the shift values Smin__6, . . . , 0, . . . , Smax__6 of the gray-scales. An image frame IF7 is generated for the seventh view VIEW7 using the shift values Smin__7, . . . , 0, . . . , Smax__7 of the gray-scales. An image frame IF8 is generated for the eighth view VIEW8 using the shift values Smin__8, . . . , 0, . . . , Smax__8 of the gray-scales. An image frame IF9 is generated for the ninth view VIEW9 using the shift values Smin__9, . . . , 0, . . . , Smax__9 of the gray-scales.

Figure 7:
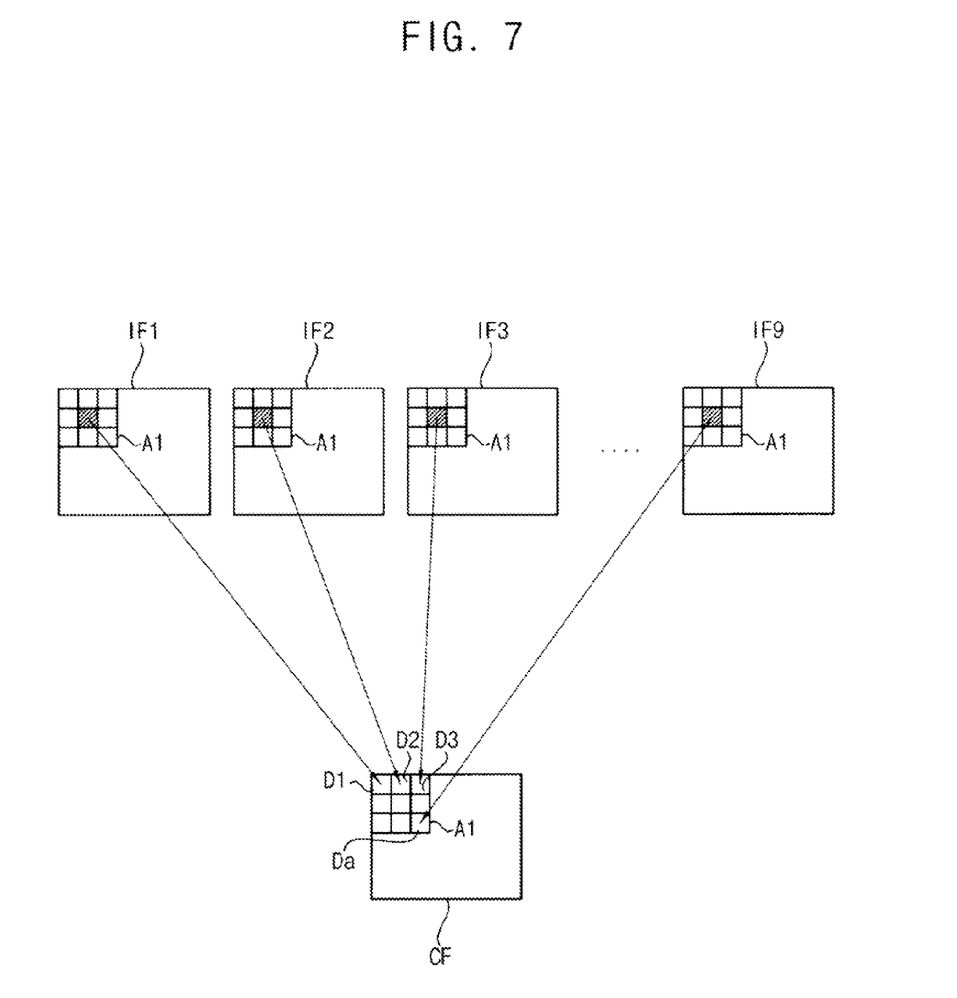
FIG. 7 is a schematic diagram illustrating a composite image generating part of FIG. 1.

FIG. 7 is a schematic diagram illustrating a composite image generating part of FIG. 1.

Referring to FIGS. 1, 6 and 7, the composite image generating part 250 combines the image frames of the multi-view image provided from the multi-view image generating part 230 to generate a composite image frame CF.

For example, the composite image generating part 250 detects a first pixel data D1 among 3×3 pixel data of a first area A1 included in the image frame IF1 for the first view VIEW1, detects a second pixel data D2 among 3×3 pixel data of the first area A1 included in the image frame IF2 for the second view VIEW2, detects a third pixel data D3 among 3×3 pixel data of the first area A1 included in the image frame IF3 for the third view VIEW3, detects a fourth pixel data D4 among 3×3 pixel data of the first area A1 included in the image frame IF4 for the fourth view VIEW4, detects a fifth pixel data D5 among 3×3 pixel data of the first area A1 included in the image frame IF5 for the fifth view VIEW5, detects a sixth pixel data D6 among 3×3 pixel data of the first area A1 included in the image frame IF6 for the sixth view VIEW6, detects a seventh pixel data D7 among 3×3 pixel data of the first area A1 included in the image frame IF7 for the seventh view VIEW7, detects an eighth pixel data D8 among 3×3 pixel data of the first area A1 included in the image frame IF8 for the eighth view VIEW8, and detects a ninth pixel data D9 among 3×3 pixel data of the first area A1 included in the image frame IF9 for the ninth view VIEW9.

The composite image generating part 250 combines the first to ninth pixel data respectively detected from the image frames IF1, IF2, IF3, . . . , IF9 for the first to ninth views VIEW1, . . . , VIEW9 into 3×3 pixel data of the first area A1 included in the composite image frame CF.

As described above, the composite image frame CF outputted from the image processing part 200 is processed by the timing control part 300 and the panel driving part 400, and is provided to the display panel 100.

Therefore, the 3D stereoscopic image having the 3D effect selected by the user may be displayed on the display panel 100.

Figure 8:
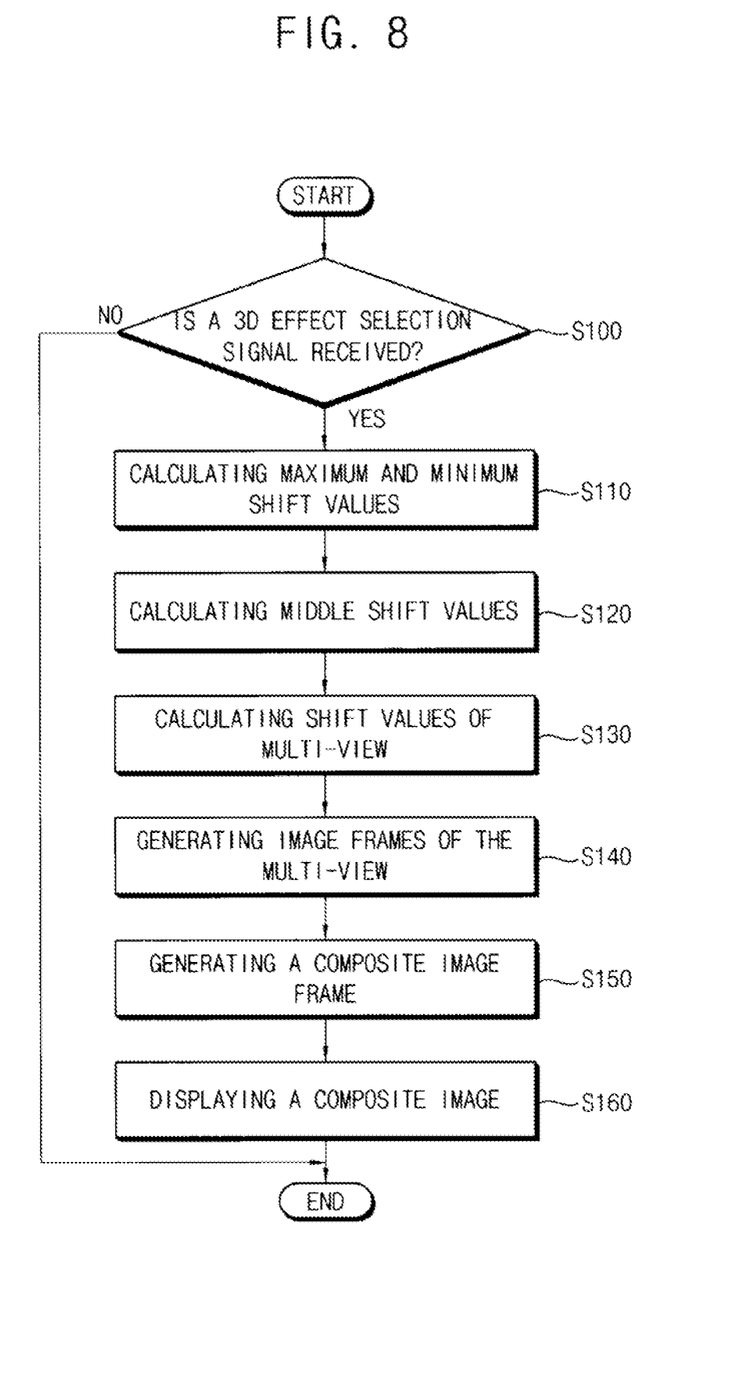
FIG. 8 is a flowchart illustrating a method of processing a 3D image for display using the display apparatus of FIG. 1 according to an exemplary embodiment of the present invention.

FIG. 8 is a flowchart illustrating a method of processing a 3D image for display using the display apparatus of FIG. 1 according to an exemplary embodiment of the present invention.

Referring to FIGS. 1, 2 and 8, the 3D effect adjusting part 210 receives the 3D effect selection signal USS inputted by the user (step S100).

The max/min calculating part 211 calculates the maximum and minimum shift values Smax_R and Smin_R of the maximum and minimum gray-scales for the reference view based on the selection depth value DV_U (step S110). The selection depth value corresponds to or is otherwise based upon to the 3D effect selection signal USS. Equation 1 described above may be used to calculate the maximum and minimum shift values.

The middle calculating part 213 calculates the middle shift values of the middle gray-scales for the reference view using the maximum and minimum shift values Smax_R and Smin_R calculated from the max/min calculating part 211 (step S120).

The multi-view image calculating part 217 calculates the shift values of the gray-scales for the multi-view image using the shift values of the gray-scales for the reference view. The shift values of the gray-scale may be calculated from the reference shift value calculating part 215 (step S130).

The multi-view image generating part 230 applies the shift values of the gray-scales for the multi-view image to the received source image signal SI and generates the image frames corresponding to the multi-view image (step S140).

The composite image generating part 250 combines the image frames of the multi-view image provided from the multi-view image generating part 230 and generates a composite image frame (step S150).

The timing control part 300 and the panel driving part 400 converts the image signal of the composite image frame into an analogue type data signal and provides the data signal to the panel part 110 of the display panel 100.

The panel part 110 of the display panel 100 displays the composite image including the images of the multi-view image. The lens part 130 of the display panel 100 refracts the composite image into the multi-view image. Accordingly, the display panel 100 displays the 3D image (step S160).

In the step (S100), when the 3D effect selection signal USS is not received, the image processing part 200 calculates the shift values of the gray-scales of the multi-view image using a default depth value DV_D. After this, the operations of the multi-view image generating part 230, the composite image generating part 250, the timing control part 300, and the panel driving part 400 are the substantially the same as described above. Accordingly, in the absence of a user providing the 3D selection signal USS, the display panel 100 may display the composite image having a default 3D effect.

Hereinafter, the same reference numerals will be used to refer to the same or like parts as those described above with respect to FIGS. 1-8, and any repetitive detailed explanation may be omitted or simplified.

Figure 9:
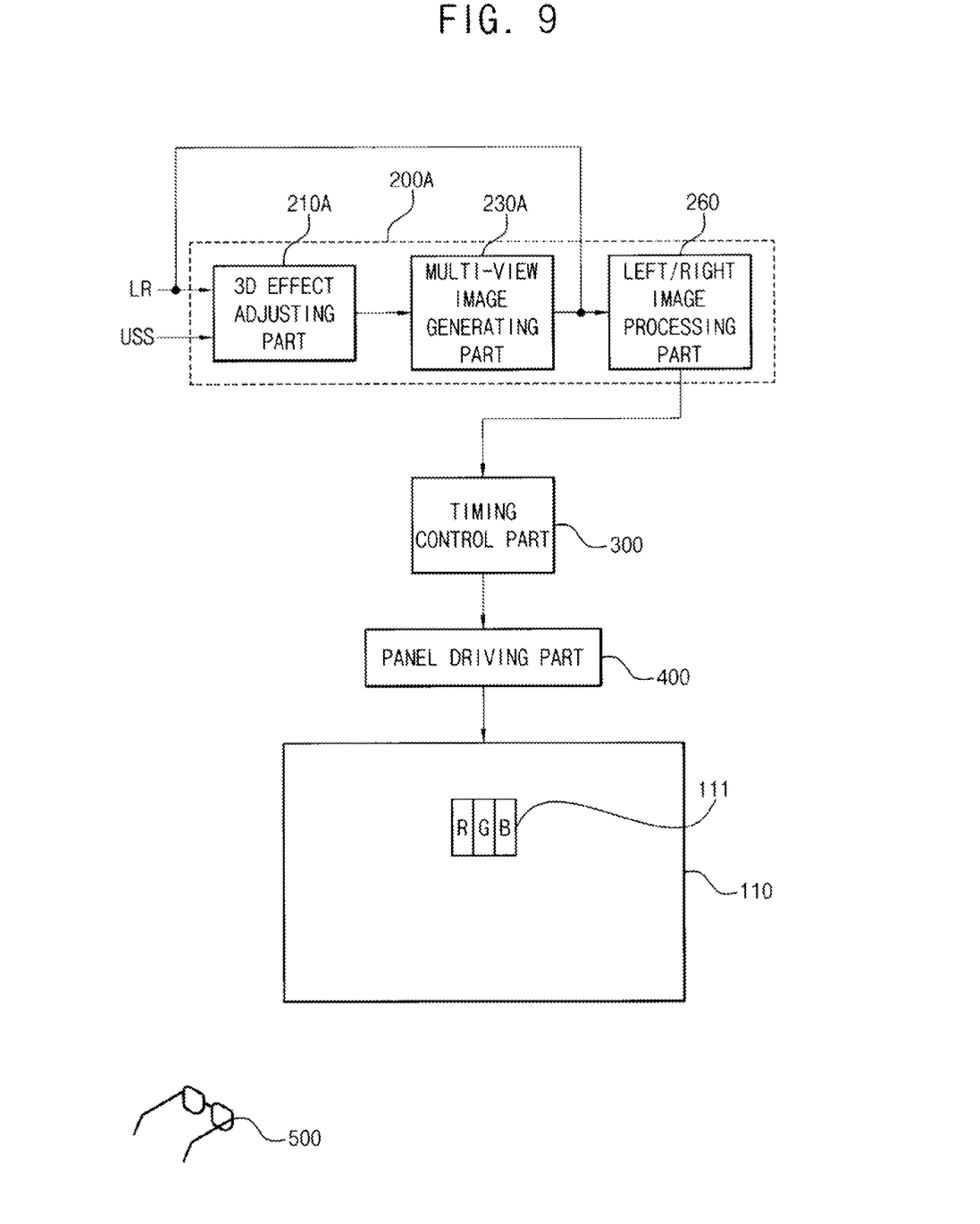
FIG. 9 is a block diagram illustrating a display apparatus according to an exemplary embodiment of the present invention.

FIG. 9 is a block diagram illustrating a display apparatus according to an exemplary embodiment of the present invention.

Referring to FIG. 9, the display apparatus includes a display panel 110, an image processing part 200A, a timing control part 300, and a panel driving part 400. The display apparatus may further include a shutter glasses part 500.

The display panel 110 includes a plurality of pixels 111 for displaying the image. The display panel 110 may be substantially the same as the previous described in FIG. 1.

The image processing part 200A includes a 3D effect adjusting part 210A, a multi-view image generating part 230A and left/right image processing part 260.

The 3D effect adjusting part 210A receives an image signal LR for a left-eye and a right-eye from an external device and a 3D effect selection signal USS inputted by a user. The 3D effect adjusting part 210A generates shift values of the gray-scales corresponding to 2 views selected based on the 3D effect selection signal USS.

The multi-view image generating part 230A generates image frames for the left-eye and the right-eye using the shift values of the gray-scales corresponding to the selected 2 views.

The left/right image processing part 260 processes the left-eye image frame and the right-eye image frame provided from the multi-view image generating part 230A according to a preset frame frequency of the display panel 110. For example, when the preset frame frequency of the display panel 110 is 120 Hz, the left/right image processing part 260 does not process the left-eye image frame and the right-eye image frame to output into the timing control part 300. When the preset frame frequency of the display panel 110 is 240 Hz, the left/right image processing part 260 repeats each of the left-eye image frame and the right-eye image frame to output 2 left-eye image frames and 2 right-eye image frames into the timing control part 300. Alternatively, when the preset frame frequency of the display panel 110 is 240 Hz, the left/right image processing part 260 processes the each of the left-eye image frame and the right-eye image frame using a motion estimation and motion compensation ("MEMC") method to output 2 left-eye image frames and 2 right-eye image frames into the timing control part 300. Wherein, 2 image frames may include an interpolation image frame and an original image frame.

When the 3D effect selection signal USS is not inputted by a user, the left/right image processing part 260 processes the each of the left-eye image frame and the right-eye image frame to output at least one of the left-eye image frame and at least one of the right-eye image frame into the timing control part 300. In this case, the 3D effect adjusting part 210A and the multi-view image generating part 230A may remain substantially inactive.

The timing control part 300 provides the left-eye image frame and the right-eye image frame received from the left/right image processing part 260 to the panel driving part 400. The timing control part 300 may insert a black image frame between the left-eye image frame and the right-eye image frame to output the image frames into the panel driving part 400.

The panel driving part 400 converts the image signal of the image frame into an analogue type data signal and provides the data signal to the display panel 110. Therefore, the display panel 110 displays a left-eye image and a right-eye image in accordance with a time division method.

The shutter glasses part 500 includes a left-eye shutter and a right-eye shutter. The shutter glasses part 500 opens the left-eye shutter and closes the right-eye shutter during a period in which the image of the left-eye is displayed on the display panel 110 and opens the right-eye shutter and closes the left-eye shutter during a period in which the image of the right-eye is displayed on the display panel 110. The opening and closing of the shutters is performed according to the control of the timing control part 300. Accordingly, the user may view the 3D stereoscopic image having the desired level of 3D depth effect.

Figure 10:
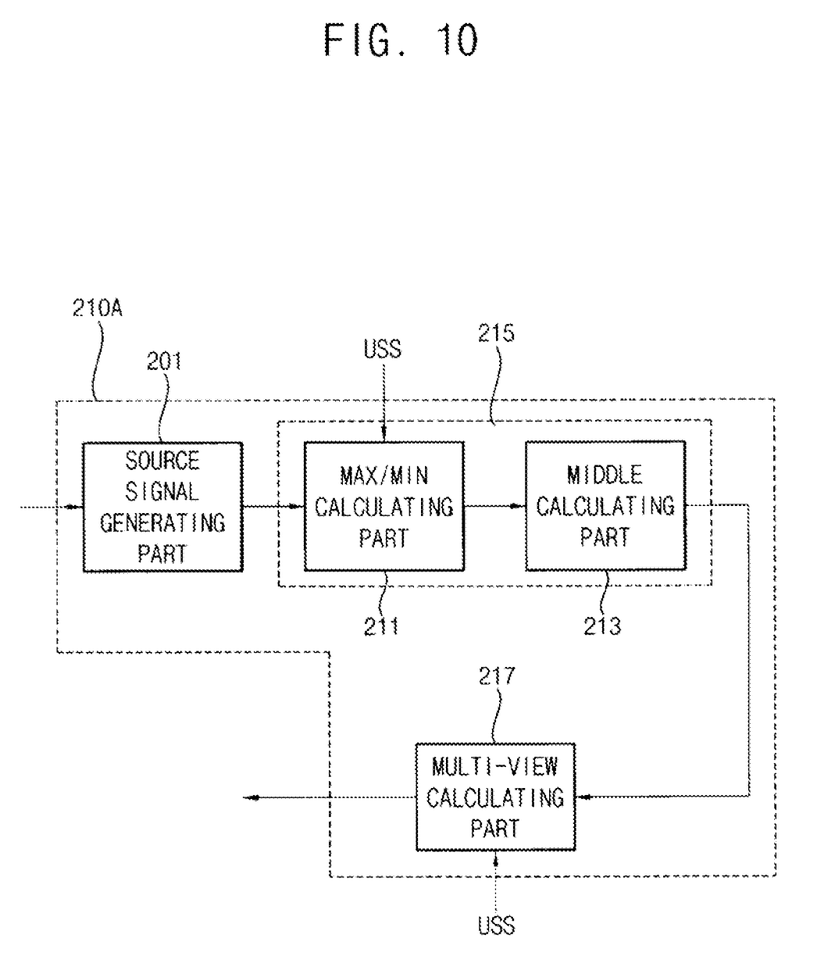
FIG. 10 is a block diagram illustrating a 3D effect adjusting part of FIG. 9.

FIG. 10 is a block diagram illustrating a 3D effect adjusting part of FIG. 9.

Referring to FIGS. 9 and 10, the 3D effect adjusting part 210A includes a source signal generating part 201, a reference shift value calculating part 215 and a multi-view image calculating part 217.

The source signal generating part 201 generates a source image signal SI and a depth value DV_U. The depth value DV_U includes depth information for the source image signal SI characterized by a view difference between the left-eye and the right-eye image signals LR.

The reference shift value calculating part 215 includes a max/min calculating part 211 and a middle calculating part 213. The max/min calculating part 211 calculates the maximum shift value Smax_R and minimum shift value Smin_R for the reference view using the 3D effect selection signal USS and an initial 3D information signal. The initial 3D information signal may include a visibility width W, a visibility distance H, a pixel pitch P_pitch, etc. The middle calculating part 213 calculates middle shift values of middle gray-scales that are between the maximum and minimum gray-scales for the reference view using the maximum and minimum shift values Smax_R and Smin_R calculated from the max/min calculating part 211.

The multi-view image calculating part 217 calculates shift values of the gray-scales respectively corresponding to the multi-view image using the shift values of the gray-scales for the reference view calculated from the reference shift value calculating part 215. The multi-view image calculating part 217 selects 2 views among the multi-view image based on the 3D effect selection signal USS inputted by the user and outputs the shift values of the gray-scales corresponding to the selected 2 views. For example, referring to FIG. 5, when the 3D effect selection signal USS selects 2 views that are a first view VIEW1 and a ninth view VIEW9, the multi-view image calculating part 217 outputs the shift values of the gray-scales respectively corresponding to the first and ninth views VIEW1 and VIEW9. Alternatively, when the 3D effect selection signal USS selects 2 views that are the first view VIEW1 and an eighth view VIEW8, the multi-view image calculating part 217 outputs the shift values of the gray-scales respectively corresponding to the first and eighth views VIEW1 and VIEW8. Thus, the multi-view image calculating part 217 outputs the shift values of the gray-scales corresponding to the selected 2 views in accordance with the user's preferences.

The multi-view image generating part 230A applies the shift values of the gray-scales corresponding to the selected 2 views to the source image signal SI and generates a left-eye image frame and a right-eye image frame from the shifted 2 views.

Figure 11:
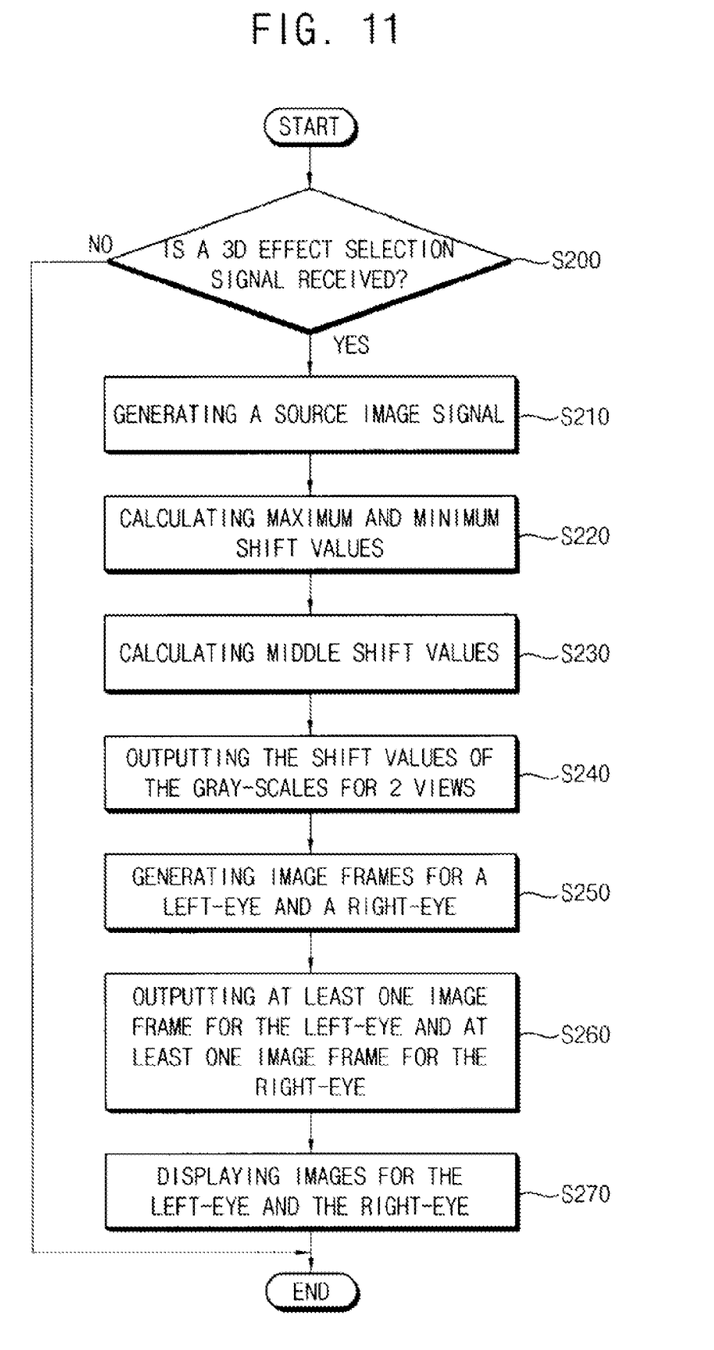
FIG. 11 is a flowchart illustrating a method of processing a 3D image using the display apparatus of FIG. 9 according to an exemplary embodiment of the present invention.

FIG. 11 is a flowchart illustrating a method of processing a 3D image using the display apparatus of FIG. 9.

Referring to FIGS. 9, 10 and 11, the 3D effect adjusting part 210A receives the 3D effect selection signal USS inputted by the user (step S200).

The source signal generating part 201 generates a source image signal SI and a depth value DV_U including depth information of the source image signal SI based on a difference between the left-eye and right-eye views of the image signals LR (step S210).

The max/min calculating part 211 calculates the maximum and minimum shift values Smax_R and Smin_R of the maximum and minimum gray-scales corresponding to the reference view based on the depth value DV_U corresponding to the 3D effect selection signal USS (step S220). For example, Equation 1 described above may be used to calculate the maximum and minimum shift values.

The middle calculating part 213 calculates middle shift values of the middle gray-scales corresponding to the reference view using the maximum and minimum shift values Smax_R and Smin_R calculated from the max/min calculating part 211 (step S230).

The multi-view image calculating part 217 calculates shift values of the gray-scales respectively corresponding to the multi-view image using the shift values of the gray-scales corresponding to the reference view calculated from the reference shift value calculating part 215. The multi-view image calculating part 217 outputs the shift values of the gray-scales corresponding to 2 views selected based on the 3D effect selection signal USS (step S240).

The multi-view image generating part 230A applies the shift values of the gray-scales for the selected 2 views to the source image signal SI and generates a left-eye image frame and a right-eye image frame from the shifted and selected 2 views (step S250).

The left/right image processing part 260 outputs the image frame for the left-eye and the right-eye into at least one of the left-eye image frame and at least one of the right-eye image frame based on the frame frequency of the display panel 110 (step S260). For example, where the frame frequency of the display panel is 120 Hz, the image frame for the left-eye and the image frame for the right-eye may be output into one left-eye image frame and one right-eye image frame, respectively. However, where the frame frequency of the display panel is 240 Hz, the image frame for the left-eye and the image frame for the right-eye may be output as two left-eye image frames and two right-eye image frames, respectively.

The timing control part 300 and the panel driving part 400 converts the image signal of the left-eye and the right-eye image frames into an analogue type data signal and displays left-eye and right-eye images on the display panel 110 in accordance with a time division method (step S270).

However, in the step (S200), when the 3D effect selection signal USS is not received, the image processing part 200A processes each of the left-eye image frame and the right-eye image frame and outputs at least one of the left-eye image frame and at least one of the right-eye image frame into the timing control part 300. In this case, the 3D stereoscopic image may have the 3D effect corresponding to a view difference between the received image signals LR for the left-eye and the right-eye.

The above-described exemplary embodiments are illustrative of the present invention and are not to be construed as limiting thereof. Modifications to the above-described exemplary embodiments are possible without materially departing from the present disclosure.

What is claimed is:

1. A method of processing a three-dimensional ("3D") image, the method comprising:
   receiving a source image;
   receiving a 3D image depth selection value from a user;
   calculating shift values for shifting the received source image based on the received 3D image depth selection value; and
   applying the calculated shift values to the source image signal to generate a 3D depth-adjusted image,
   wherein calculating the shift values of the gray-scales for the reference view comprises:
   calculating a maximum shift value to a maximum gray-scale for the reference view based on the received 3D image depth selection value;
   calculating a minimum shift value to a minimum gray-scale for the reference view using the calculated maximum shift value; and
   calculating middle shift values to middle gray-scales for the reference view using the calculated maximum and minimum shift values and the middle gray-scales between the maximum gray-scale and the minimum gray-scale for the reference view,
   wherein the steps of receiving the source image, receiving the 3D image depth selection value, calculating the shift value, and applying the calculated shift value are performed using one or more circuits.

2. The method of claim 1, wherein calculating the shift values includes:
   calculating shift values of gray-scales for a reference view further comprises; and
   calculating shift values of gray-scales respectively corresponding to a plurality of views of the received source image using the calculated shift values of the gray scales for the reference view, wherein applying the calculated shift values to the source image signal includes applying the calculated shift values of the gray-scales respectively corresponding to the plurality of views to the 3D source image signal to generate a plurality of image frames.

3. The method of claim 2, further comprising: generating a composite image using the generated plurality of the image frames.

4. The method of claim 1, wherein calculating the middle shift values of the middle gray-scales comprises:
   calculating a first middle shift value satisfying a linear function that connects a preset shift value to the maximum shift value; and
   calculating a second middle shift value satisfying a linear function that connects the preset shift value to the minimum shift value.

5. The method of claim 2, wherein the received 3D source image is generated using a view difference between a left-eye image signal and a right-eye image signal.

6. The method of claim 5, wherein applying the shift values of the gray-scales comprises:
   selecting two views based on the received 3D image depth selection signal; and
   applying the shift values of the gray-scales for the selected two views to the received 3D source image to generate a left-eye image frame and a right-eye image frame.

7. The method of claim 6, further comprising: generating at least one of the left-eye image frame and at least one of the right-eye image frame using the left-eye image signal and the right-eye image signal, respectively.

8. The method of claim 1, wherein calculating the middle shift values of the middle gray-scales comprises:
   calculating a first middle shift value satisfying a non-linear function that connects a preset shift value to the maximum shift value; and
   calculating a second middle shift value satisfying a non-linear function that connects the preset shift value to the minimum shift value.

9. The method of claim 1, further comprising:
   displaying the 3D depth-adjusted image using an autostereoscopic display device.

10. A display apparatus comprising:
    a display panel displaying a 3D image;
    a 3D effect adjusting circuit calculating shift values of gray-scales for a reference view of the 3D image using a 3D effect selection signal having a 3D image depth selection value inputted by a user and calculating shift values of the gray-scales respectively corresponding to a plurality of views of the 3D image using the shift values of the gray-scales for the reference view;
    a multi-view image generating circuit applying the shift values of the gray-scales respectively corresponding to the plurality of views to a source image signal to generate a plurality of image frames; and
    a panel driving circuit converting an image signal of the image frames into an analogue-type data signal and providing the analogue-type data signal to the display panel,
    wherein the 3D effect adjusting circuit comprises:
    a max/min calculating circuit calculating a maximum shift value of a maximum gray-scale for the reference view based on the 3D image depth selection value and calculating a minimum shift value of a minimum gray-scale for the reference view using the maximum shift value;
    a middle calculating circuit calculating middle shift values of middle gray-scales for the reference view using the maximum and minimum shift values, and the middle gray-scales between the maximum gray-scale and the minimum gray-scale for the reference view; and
    a multi-view image calculating circuit calculating shift values of the gray-scales respectively corresponding to a plurality of views using the shift values of the gray-scales for the reference view.

11. The display apparatus of claim 10, wherein the middle calculating circuit calculates a first middle shift value satisfying a linear function that connects a preset shift value to the maximum shift value, and calculates a second middle shift value satisfying a linear function that connects the preset shift value to the minimum shift value.

12. The display apparatus of claim 10, wherein the middle calculating circuit calculates a first middle shift value satisfying a nonlinear function that connects a preset shift value to the maximum shift value, and calculates a second middle shift value satisfying a nonlinear function that connects the preset shift value to the minimum shift value.

13. The display apparatus of claim 10, further comprising: a composite image generating circuit generating a composite image using the plurality of image frames.

14. The display apparatus of claim 13, wherein the display panel comprises:
    a panel part including a plurality of pixels; and
    a lens part disposed on the panel part and including a lens refracting an image displayed on the panel part into a plurality of views.

15. The display apparatus of claim 10, further comprising: a source image generating circuit generating the source image signal using a view difference between a left-eye image signal and a right-eye image signal.

16. The display apparatus of claim 15, wherein the multi-view image calculating circuit selects two views among the plurality of views based on the 3D image depth selection value of the 3D effect selection signal inputted by the user.

17. The display apparatus of claim 16, wherein the multi-view image calculating circuit applies the shift values of the gray-scales for the selected two views to the source image signal to generate a left-eye image signal and a right-eye image signal.

18. The display apparatus of claim 17, further comprising: a left/right image processing circuit generating at least one of the left-eye image frame and at least one of the right-eye image frame using the left-eye image signal and the right-eye image signal, respectively.

* * * * *